(12) United States Patent
Sample (10) Patent No.: US 7,299,235 B2
(45) Date of Patent: Nov. 20, 2007

(54) METHOD AND APPARATUS FOR TERNARY PATRICIA TRIE BLOCKS

(75) Inventor: Neal Sample, Santa Cruz, CA (US)

(73) Assignee: Rightorder, Incorporated, San Jose, CA (US)

( * ) Notice: Subject to any disclaimer, the term of this patent is extended or adjusted under 35 U.S.C. 154(b) by 465 days.

(21) Appl. No.: 10/899,657

(22) Filed: Jul. 26, 2004

(65) Prior Publication Data

US 2005/0027679 A1  Feb. 3, 2005

Related U.S. Application Data

(60) Provisional application No. 60/490,249, filed on Jul. 28, 2003, provisional application No. 60/490,284, filed on Jul. 28, 2003.

(51) Int. Cl.
*G06F 17/30* (2006.01)

(52) U.S. Cl. ............. 707/100; 707/3; 707/10; 707/205; 707/206

(58) Field of Classification Search ........ 707/3, 707/100
See application file for complete search history.

(56) References Cited

U.S. PATENT DOCUMENTS

| | | | | |
|---|---|---|---|---|
| 5,841,376 A | * | 11/1998 | Hayashi | 341/51 |
| 5,864,867 A | * | 1/1999 | Krusche et al. | 707/104.1 |
| 5,946,679 A | * | 8/1999 | Ahuja et al. | 707/3 |
| 6,076,089 A | * | 6/2000 | Fischer et al. | 707/102 |
| 6,347,318 B1 | * | 2/2002 | Rokicki | 707/100 |
| 6,694,323 B2 | * | 2/2004 | Bumbulis | 707/101 |
| 2001/0010048 A1 | * | 7/2001 | Kobayashi | 707/2 |
| 2002/0143747 A1 | * | 10/2002 | Tal et al. | 707/3 |
| 2003/0195890 A1 | * | 10/2003 | Oommen | 707/100 |
| 2005/0102255 A1 | * | 5/2005 | Bultman | 707/1 |

* cited by examiner

*Primary Examiner*—Cam Y T Truong
(74) *Attorney, Agent, or Firm*—Michael A. Glenn; Glenn Patent Group (57) ABSTRACT

An architecture and method for efficient termination of variable length keys in a PATRICIA trie is disclosed. By adding a null-labeled link, it is possible to terminate such variable length PATRICIA trie nodes, allowing to overcome the need for complex termination solutions. Specifically, a ternary PATRICIA block is introduced.

8 Claims, 5 Drawing Sheets

METHOD AND APPARATUS FOR TERNARY PATRICIA TRIE BLOCKS

CROSS REFERENCE TO RELATED APPLICATIONS

This application claims priority to U.S. provisional patent application Ser. No. 60/490,249 submitted Jul. 28, 2003 and U.S. provisional patent application Ser. No. 60/490,284 submitted Jul. 28, 2003, which are incorporated herein in their entirety by this reference thereto.

BACKGROUND OF THE INVENTION

1. Technical Field

The invention relates generally to PATRICIA tries. More specifically, this invention relates to an improved termination of variable length keys using ternary PATRICIA tries.

2. Background of the Invention

The trie is a data structure that allows for a fast search and data retrieval over a large text. Tries are used to implement the dictionary abstract data type (ADT), where basic operations, such as search, insert, and delete can be performed. Further, a trie can be used for encoding and compression of text.

One type of trie known in the art is the practical algorithm to retrieve information coded in alphanumeric or PATRICIA (*PATRICIA—Practical algorithm to retrieve information coded in alphanumeric*, D. R. Morrison, J. ACM, 15 (1968) pp. 514-534). The PATRICIA is a trie shown by D. R. Morrison in 1968. It is well known in the industry as a compact way for indexing, and is commonly used in databases, as well as in networking technologies.

Figure 1:
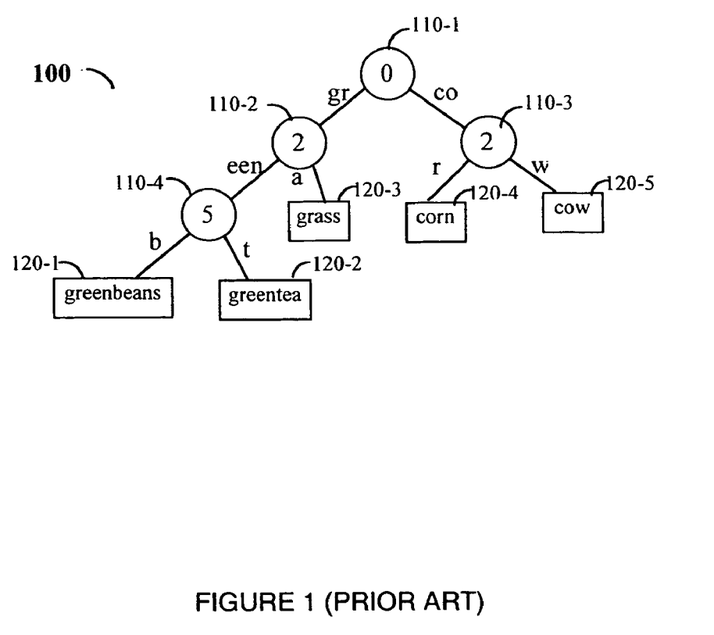
FIG. 1 is an example of a PATRICIA trie for an alphabetical case (prior art)

In a PATRICIA implementation, trie nodes that have only one child are eliminated, i.e. unary nodes are collapsed. The remaining nodes are labeled with a character position number that indicates the nodes' depth in the uncompressed trie. FIG. 1 shows an example of such an implementation of a PATRICIA trie for an alphabetical case. The words to be stored are "greenbeans," "greentea," "grass," "corn," and "cow." The first three words differ from the last two words in the first letter, i.e. three words begin with the letter "g," while the other two words begin with the letter "c." Hence, there is a difference at the first position. Therefore, there is a node 110-1 at depth "0" separating the "g" words from the "c" words. The edge connecting nodes 110-1 and 110-2 holds the characters "gr" and the edge connecting nodes 110-1 and 110-3 holds the characters "co." Moving on the "gr" side, the next time a difference is found is in the third position where two words have an "e" while one word has an "a." Therefore, a node 110-2 at that level indicates a depth level of "2," i.e. the depth level equivalent to the length of the string "gr." Continuing down the left path reveals that the next time a different letter is found is at a sixth position of the "greenbeans" and "greentea" words where one word has a "b" while the other has a "t." Therefore, there is a node 110-4 at depth "5." The words, i.e. keys are stored in the leaves 120. For example, leaf 120-1 contains the key "greenbeans," the leaf 120-2 contains the key "greentea," and so on.

The problem with this implementation is that keys are not uniquely specified by the search path. Hence, the key itself has to be stored in the appropriate leaf. An advantage of this PATRICIA implementation is that only about t*n bits of storage are required, where t is the size of the alphabet and n is the number of leaves.

Figure 2:
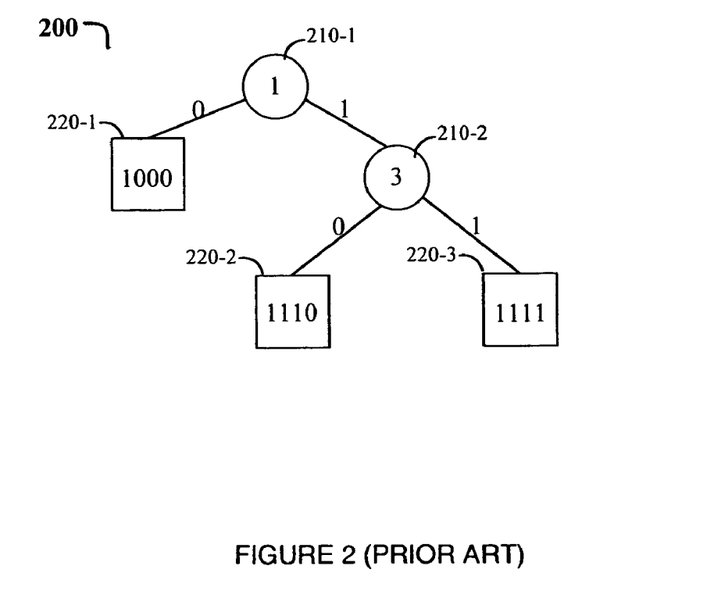
FIG. 2 is an exemplary PATRICIA trie for a numerical case (prior art)

An alphabet is group of symbols, where the size of an alphabet is determined by the number of symbols in the group. That is, an alphabet in which t=2 is a binary alphabet having only two symbols, possibly 0 and 1. FIG. 2 shows an exemplary implementation for such an alphabet with two nodes 210-1 and 210-2, and three leaves 220-1, 220-2, and 220-3, including the keys 1000, 1110, and 1111 respectively. For binary PATRICIA tries, the number of internal nodes 210 is equal to the number of leaves 220 minus 1. The height of the PATRICIA trie is bounded by the number of leaves n.

A PATRICIA trie is either a leaf L (k) containing a key k or a node N (d, l, r) containing a bit offset d=0 along with a left sub-tree l, and a right sub-tree r. This is a recursive description of the nodes of a PATRICIA tree, and leaves descending from a node N (d, l, r) must agree on the first d-1 bits. A description of PATRICIA tries may be found in Bumbulis and Bowman, *A Compact B-Tree*, Proceedings of the 2002 ACM SIGMOD International Conference on Management of Data, pages 533-541, which is herein incorporated in its entirety by this reference thereto.

A block of pointers may be now prepared using the PATRICIA trie architecture, the block having pointers that allow for efficient retrieval of the data. The number of pointers, or fanout, of the block may be calculated, based on several parameters.

The assumption is that the keys $k_i$ are unique. In cases where such keys are not unique, unique keys must be created. Several strategies are suggested by prior art, such as the appending of a record identifier (RID) of the record to the respective key. Assuming that normalization of all keys to binary strings in an order preserving fashion is possible, one could implement the normalization such that no key is a prefix of another. This is trivially possible for fixed length keys. For variable length keys, an end marker would have to be added, while maintaining order. For bounded length keys, a strategy could be to pad all keys with binary 1s to a length that is greater than the length in bits of any key one could possibly encounter. Using such a strategy simplifies the algorithms and serves for alignment purposes too. The deficiencies of the prior art are clear: there is a difficulty in handling indexes that are over data sets containing duplicate values, the complexity of the handling of prefix keys, and the need to pad with bits in order to terminate indexed keys.

It would be therefore advantageous to provide a practical solution for handling the termination of variable length keys of a PATRICIA trie. It would be furthermore advantageous if such solution would eliminate the need for the use of tricks or padding keys to longer than the longest possible key. It would be further advantageous if such solution is applicable for the indexing of infinite strings.

SUMMARY OF THE INVENTION

An architecture and method for efficient termination of variable length keys in a PATRICIA trie is disclosed. By adding a null-labeled link, it is possible to terminate such variable length PATRICIA trie nodes, allowing to overcome the need for complex termination solutions. Specifically, a ternary PATRICIA block is introduced.

DETAILED DESCRIPTION OF THE INVENTION

Figure 3:
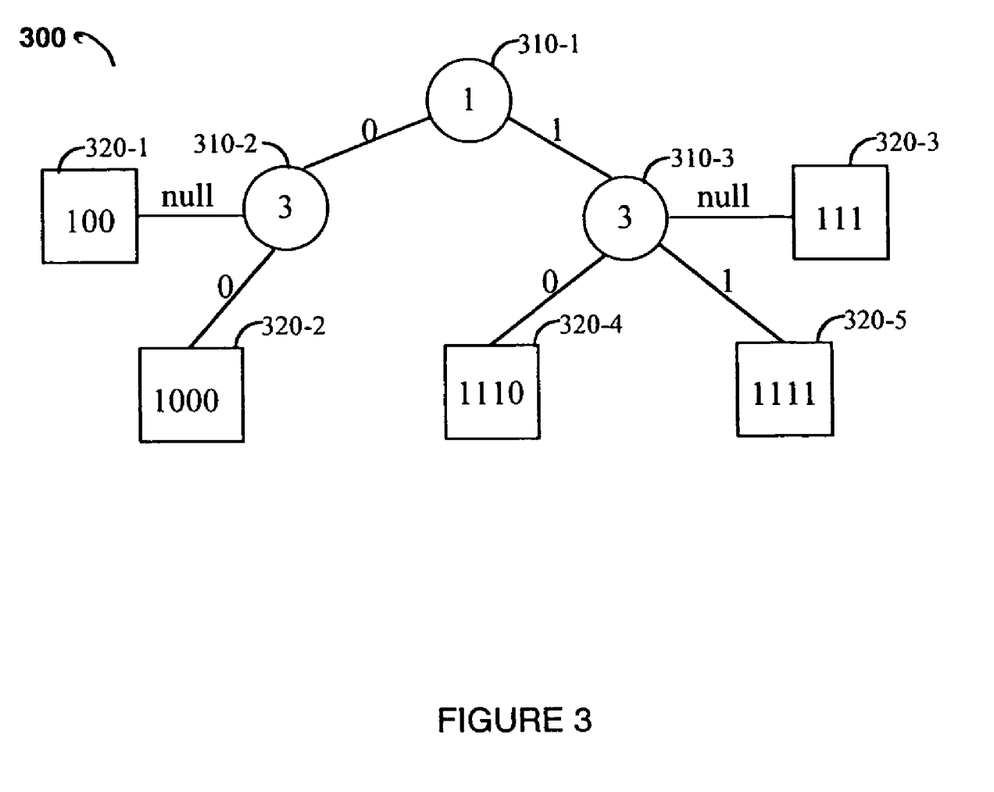
FIG. 3 is an exemplary PATRICIA trie with keys that are a prefix of another.

The invention comprises a method and apparatus for adding a leaf to a PATRICIA trie implementation that may optionally belong to a node. A computer memory, the computer memory contains computer program instructions for operating a computer to create a labeled PATRICIA trie block. Reference is now made to FIG. 3, where a non-limiting exemplary embodiment of a modified PATRICIA trie 300 with keys that are a prefix of another, is shown. On the left branch, a key 320-1 with a value of 100 is a prefix of key 320-2 with a value of 1000, resulting in a PATRICIA trie node having two sub-trees originated from node 310-2. One sub-tree is labeled as null and the other as 0. These labels are also referred to the node's label. On the right branch, a key 320-3 with a value of 111 is a prefix to keys 320-4 and 320-5 having the values of 1110, and 1111 respectively, resulting in a PATRICIA trie node having three sub-trees originated from node 310-3. One sub-tree is labeled as null, the second as 0, and the third as 1. It is also possible to have other combinations. Thus, this embodiment of the invention comprises a ternary implementation of a PATRICIA trie block. The null elements are added as a means of handling variable-length binary keys that do not have a unique end-of-key token.

It should be noted that if the input key set is at least partially constrained and it uses a unique end-of-key sequence in a well-known position, this addition would not be required. An example of such a well-behaved key set is the set of null terminated ASCII strings.

A node in the modified PATRICIA trie disclosed herein can be described as N(d, l, r, n) containing a bit offset d=0 along with a left sub-tree l, a right sub-tree r, and the optional leaf n. Using the Ferguson strategy, the PATRICIA trie 300 encodes as 1:3:null:leaf:3:null:leaf:leaf, yielding a linear time search. However, it would be advantageous to use logarithmic search strategies.

Figure 4:
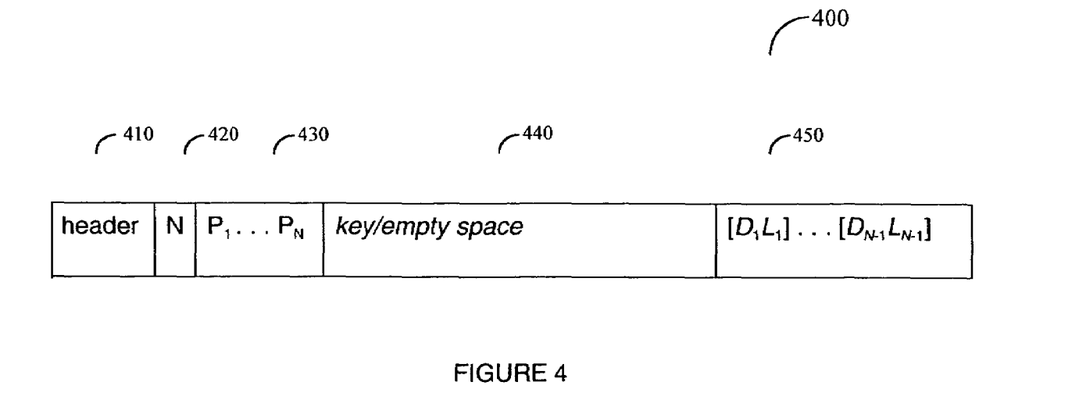
FIG. 4 is an exemplary node array for a PATRICIA trie representation.

In accordance with an exemplary embodiment of the invention, each PATRICIA trie can be stored as an ordered array of leaves together with an array that encodes structure of the internal nodes of the PATRICIA trie. Reference is now made to FIG. 4 where a non-limiting and exemplary representation of an order array 400 of leaves is shown. The array 400 is the size of a block and comprises a header portion 410, a number-of-nodes portion 420, a plurality of pointers [$P_1$] through [$P_N$] portion 430, a key or empty spaces 440, and pairs of offset and left node information [$D_1$, $L_1$] through [$D_N$, $L_N$] portion 450. The invention uses a bit aligned representation for such array, allowing a significant increase in the number of pointers to be used through bit shaving techniques. This is opposed to prior art implementations that use a byte-aligned representation and perform a byte-aligned calculation of the fanout. The fanout determines the number of pointers that can be stored in a PATRICIA trie block. For example, using prior art implementations the maximum fanout for blocks may be calculated by the following formula:

$$Int\left(\frac{BlockSize - HeaderSize - N}{D + L + P}\right); \quad (1)$$

where, N is the total number of leaves, D is the bit offset, L are the number of leaves in the left sub-tree as encountered in a pre-order traversal, and P is the size of a pointer to a block. In a typical implementation where a block size is 8K bytes, the header size is 30 bytes, the N field is four bytes, the offset $D_i$ and the left node information $L_i$ holds two bytes each, and a pointer $P_i$ is four bytes for internal blocks and four bytes for pointers to data. Inserting the data in the formula results in:

$$Int\left(\frac{8192 - 30 - 4}{2 + 2 + 4}\right) = 1019 \quad (2)$$

Hence, the internal blocks can have a maximum fanout of 1019.

There is an over-commitment of bits to both the D and L portions of the array, e.g. two bytes, or sixteen bits each, and as shown above, significantly limiting the maximum fanout of an eight bytes block to 1019. Yet, a fanout of 1019 means that only 10 bits are actually required for each D and L portion in the block, however, a 10-bit value is not byte aligned. Storing the value of $D_1$ in the header portion 410 allows storing all $D_i$ for all i>1 as offsets instead of absolute addresses, potentially saving additional bits. Furthermore, in practical applications, it is more realistic to devote two bytes for N, reducing the number of leaves from over 4 billion to over 65 thousand, which is still applicable for block sizes greater than half a megabyte. Furthermore, the value of N can also be bit-aligned rather than byte-aligned, allowing for the shaving-off of additional bits. However, a practical value for N should be equal to or greater than the number of bits of D. For the implementation discussed above where a block size may be eight kilo bytes, i.e. 65,536 bits, and the header is thirty bytes, i.e. 240 bits, the bit-aligned technique used by the invention allows one to define the other parameters as follows: N equals two bytes, i.e. sixteen bits, $D_i$ and $L_i$ equals twelve bits each such that D+L are byte aligned, and that the $P_i$ are twenty bits for internal blocks so that they align on at least half-byte values, and thus require only a single extra bit to reference. The calculation of the fanout now shows:

$$Int\left(\frac{65536 - 240 - 16}{12 + 12 + 20}\right) = 1483; \quad (3)$$

It is clearly shown that with a modicum of bit-shaving, the maximum fanout increased from 1019 to 1483, an increase of 45%, for the same 8K block without significantly degrading the practicality of the PATRICIA trie usage in databases, networking, and other applications.

Figure 5:
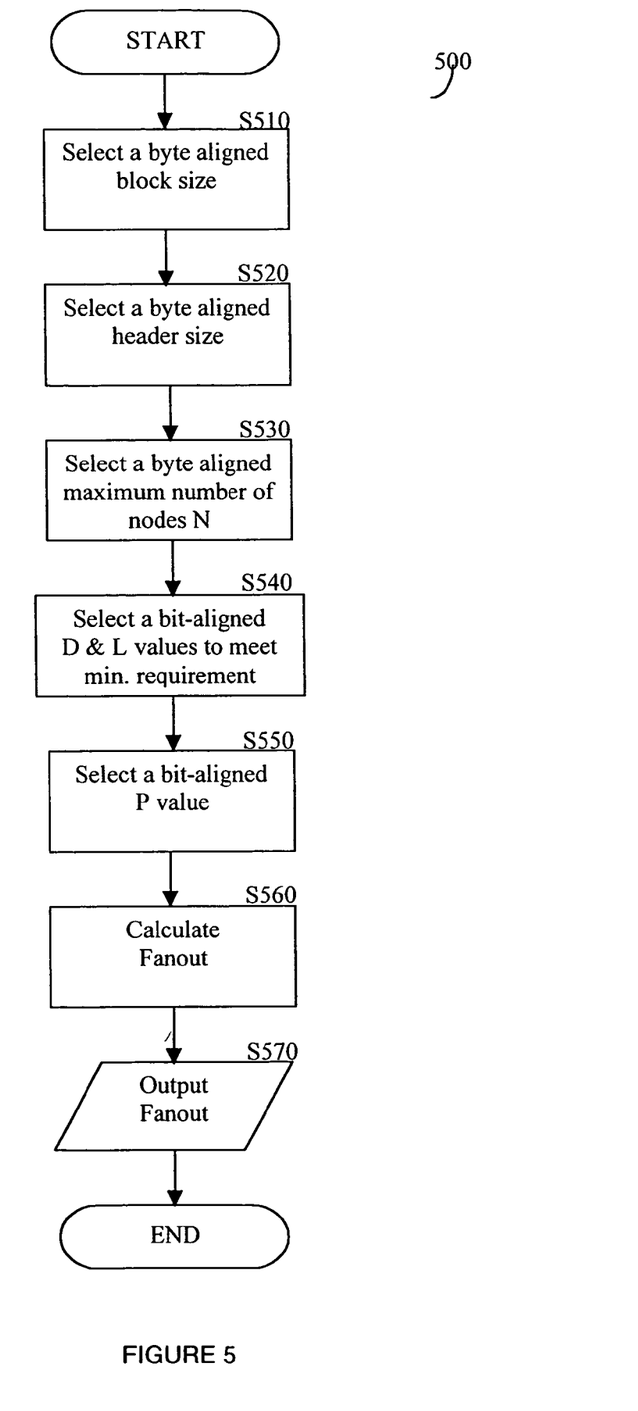
FIG. 5 is an exemplary flowchart describing the steps for calculating the increased fanout in a PATRICIA trie according to the invention.

Reference is now made to FIG. 5 where an exemplary flowchart 500 describing the steps for calculating the increased fanout in a PATRICIA trie is shown. In step S510, the value of the block size in bits is determined, preferably being byte aligned. In step S520, the value of the header size in bits is determined, preferably being byte aligned. In step S530, the value representing the number of nodes in the bock is determined, preferably being byte aligned. In step S540, bit-aligned values of the length D of the bit offset and the number L of leaves in the left sub-tree are determined. Preferably, D and L have similar values and meet a minimum size criterion that can be extracted from the formula discussed above. Assuming that D is roughly equal to L then it is necessary to maintain the following:

$$D+\log_2(2D+P) \geq \log_2(\text{BlockSize}-\text{HeaderSize}-N); \quad (4)$$

Therefore, for a 65,536 bit block, a header of 240 bits and an N value of sixteen bits, and a P of twenty bits, the equation is as follows:

$$D+\log_2(2D+20) \geq \log_2(65536-240-16)=15.993; \quad (5)$$

For D=10 bits, the left side of the inequality yields 15.322, clearly an incorrect solution. However, selecting D at a value of eleven bits results in the left side of the inequality being 16.393, providing for a correct solution. Such calculation can be easily repeated for various block sizes and other parameters. In step S550, a bit-aligned value for P of the size of a pointer is determined. In steps S560, the maximum number of pointers for the block, the size of which was determined in steps S510, are calculated based on the formula:

$$Int\left(\frac{BlockSize - HeaderSize - N}{D + L + P}\right). \quad (6)$$

In step S570 the results of the calculation made in step S560 are output, for example, by means of display, printout, saving into a file, and the like.

Figure 6:
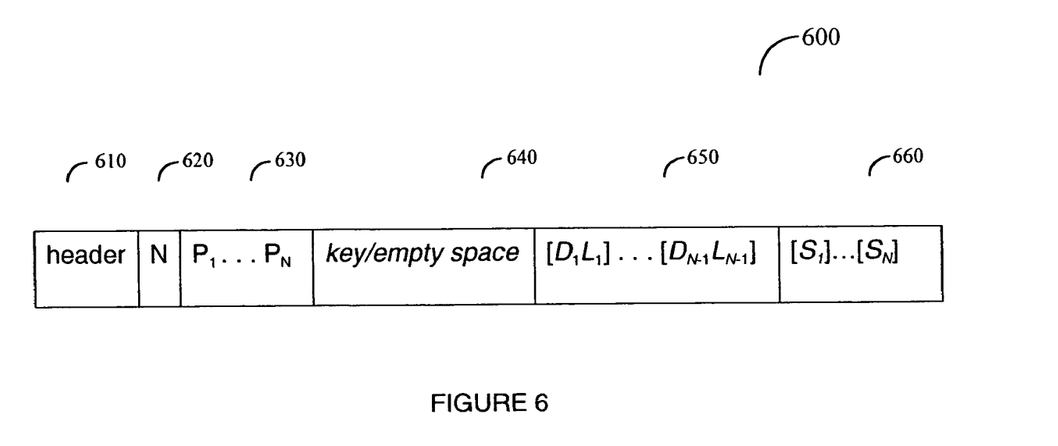
FIG. 6 is an exemplary modified node array for a PATRICIA trie representation in accordance with the disclosed invention.

Reference is now made to FIG. 6 where a non-limiting exemplary modified node array 600 for a modified PATRICIA trie representation in accordance with the invention, is shown. The array 600 is of a size of a block and comprises a header portion 610, a number-of-nodes portion 620, a plurality of pointers [$P_1$] through [$P_N$] portion 630, a key or empty spaces 640, pairs of offset and left node information [$D_1$, $L_1$] through [$D_N$, $L_N$] portion 650, and a status array portion 660. The pairs of offset and left node information [$D_1$, $L_1$] are described in greater detail above. The status array 660 includes a status indication [$S_1$] through [$S_N$] for each of pointers [$P_1$] through [$P_N$]. The status array 660 further indicates the state of labels of each node in the modified PATRICIA trie. There are four possibilities for the node's labels: all labels present, no null-label, no left (0) label, or no right (1) label. It is therefore possible to represent these four states by merely two bits. Using the technique shown above, there is no penalty on the number of pointers, as shown in the example for the case of an 8 bytes PATRICIA trie block. Moreover, through the use of the invention it is possible to eliminate limitations imposed by prior art solutions.

Firstly, quite often, indexes are over data sets that contain duplicate values, hence presenting a problem of key uniqueness. By adding null-labeled links, it is not necessary to implement explicit tricks to make each key unique. Key recovery and indexing processes are significantly reduced in complexity, at the expense of having a somewhat larger index data structure.

Secondly, in standard PATRICIA tries, a set of tricks must be developed for the handling of a key that is a proper prefix of another key. This is generally handled by making all keys unique. However, this is not always possible for arbitrary strings and, unless restrictions are placed on the values of the keys in the index, there must be some mechanism in place to handle the situation of prefix keys. Using the null-labeled links as part of the index structure obviates the need for an exception mechanism to deal with prefix keys.

Thirdly, by allowing null-labeled links, there is no need to pad and terminate indexed keys. This means that keys can be truly general. While ASCII strings have specific values in the set of keys to be indexed that only appear at the very end of the key, this is not necessarily the case for other key types. There are multiple examples of infinite strings, such as the decimal representations of pi or e, or pure digital strings, such as, an MP3, that can assume any byte value at any position. These keys cannot be terminated (in the case of decimal pi) or padded (in the case of an MP3) and retain their original value. Having null-labeled links handles these more difficult cases, and allows for their indexing.

Based on the invention disclosed herein it is further possible to provide a cascading index of PATRICIA tries having support for the null-label capability. This is particularly useful when a PATRICIA trie block is to be split due to size or other considerations. By adding a PATRICIA trie block to index the split blocks, and using the capability of having up to three sub-trees from a node, rather than the traditional two sub-trees, the invention overcomes limitations in prior art solutions.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer implemented method for creating a labeled PATRICIA trie block, the computer implemented method comprising the steps of:
   selecting a size of said labeled PATRICIA trie block;
   defining a size of a header of said labeled PATRICIA trie block;
   determining a number of nodes of a PATRICIA trie;
   determining a number of pointers of said nodes;
   determining a number of bits for an offset value of said labeled PATRICIA block;
   determining a number of bits of a left sub-tree of the PATRICIA trie;
   using a bit aligned representation to allow an increase in the number of pointers;
   determining a number of bits for a status indicator of said labeled PATRICIA trie block, wherein the labeled PATRICIA trie block is maximum the number of pointers, the number of pointers determines a fanout in said PATRICIA trie block;
   creating the labeled PATRICIA trie block based on said determining a number of bits for a status indicator and the determining of said fanout;
   the determining of said fanout comprises the steps of:
   selecting a number of bits devoted to storing a number of nodes for a first practice value;
   selecting a number of bits devoted to a number of left leaves for a second practical value;
   selecting a number of bits devoted to said offset value for a third practice value;
   selecting a number of bits devoted to said number of pointers for a fourth practical value;
   said second practical value and said third practical value are substantially equal; and selected values for said second practical value and said third practical value adhere to an inequality, where said third practice value plus logarithm sub two of sum of said second practical value, said third practical value and said fourth practical value is equal to or larger than logarithm sub two of block size, header size and said first practical value.

2. The computer implemented method of claim 1, wherein a total number of bits for said second practical value and said third practical value are aligned on at least half a byte.

3. A computer implemented method for creating a labeled PATRICIA trie block, the computer implemented method comprising the steps of:
   selecting a size of said labeled PATRICIA trie block;
   defining a size of a header of said labeled PATRICIA trie block;
   determining a number of nodes of a PATRICIA trie;
   determining a number of pointers of said nodes;
   determining a number of bits for an offset value of said labeled PATRICIA trie block;
   using a bit aligned representation to allow an increase in the number of pointers;
   determining a number of bits of a left sub-tree of the PATRICIA trie;
   determining a number of bits for a status indicator of said labeled PATRICIA trie block;
   wherein the labeled PATRICIA trie block is maximum the number of pointers, the number of pointers determines a fanout in said PATRICIA trie block;
   wherein the status indicator comprises an indication of labels respective of each node of said PATRICIA trie block;
   wherein said indication of null-labels comprise any of all labels present, no null-label, no left label, and no right label;
   creating the labeled PATRICIA trie block based on said determining a number of bits for a status indicator and the determining of said fanout;
   the determining of said fanout comprises the steps of:
   selecting a number of bits devoted to storing a number of nodes for a first practice value;
   selecting a number of bits devoted to a number of left leaves for a second practical value;
   selecting a number of bits devoted to said offset value for a third practice value;
   selecting a number of bits devoted to said number of pointers for a fourth practical value;
   said second practical value and said third practical value are substantially equal; and
   selected values for said second practical value and said third practical value adhere to an inequality, wherein said third practice value plus logarithm sub two of sum of said second practical value, said third practical value and said fourth practical value is equal to or larger than logarithm sub two of block size, header size and said first practical value.

4. The computer implemented method of claim 3, wherein a total number of bits for said second practical value and said third practical value are aligned on at least half a byte.

5. A computer memory, said computer memory containing computer program instructions for operating a computer to create a labeled PATRICIA trie block, said computer program instructions executing a computer implemented method comprising the steps of:
   selecting a size of said labeled PATRICIA trie block;
   defining a size of a header of said labeled PATRICIA trie block;
   determining a number of nodes of a PATRICIA trie;
   determining a number of pointers of said nodes;
   determining a number of bits for an offset value of said labeled PATRICIA trie block;
   using a bit aligned representation to allow an increase in the number of pointers;
   determining a number of bits of a left sub-tree of the PATRICIA trie;
   determining a number of bits for a status indicator of said labeled PATRICIA trie block;
   wherein the labeled PATRICIA trie block is maximum the number of pointers, the number of pointers determines a fanout in said PATRICIA trie block;
   wherein the status indicator comprises an indication of labels respective of each node of said PATRICIA trie block;
   wherein said indication of null-labels comprise any of all labels present, no null-label, no left label, and no right label;
   creating the labeled PATRICIA trie block based on said determining a number of bits for a status indicator and the determining of said fanout;
   the determining of said fanout comprises the steps of:
   selecting a number of bits devoted to storing a number of nodes for a first practice value;
   selecting a number of bits devoted to a number of left leaves for a second practical value;
   selecting a number of bits devoted to said offset value for a third practice value;
   selecting a number of bits devoted to said number of pointers for a fourth practical value;
   said second practical value and said third practical value are substantially equal; and
   selected values for said second practical value and said third practical value adhere to an inequality, wherein said third practice value plus logarithm sub two of sum of said second practical value, said third practical value and said fourth practical value is equal to or larger than logarithm sub two of block size, header size and said first practical value.

6. The computer memory of claim 5, wherein a total number of bits corresponding to said third practical value, said fourth practical value, and said fifth practical value are aligned on at least half a byte.

7. A computer memory, said computer memory containing computer program instructions for operating a computer to create a labeled PATRICIA trie block, said computer program instructions executing a computer implemented method comprising the steps of:
   selecting a size of said labeled PATRICIA trie block;
   defining a size of a header of said labeled PATRICIA trie block;
   determining a number of nodes of a PATRICIA trie;
   determining a number of pointers of said nodes;
   determining a number of bits for an offset value of said labeled PATRICIA trie block;
   using a bit aligned representation to allow an increase in the number of pointers;
   determining a number of bits of a left sub-tree of the PATRICIA trie;
   determining a number of bits for a status indicator of said labeled PATRICIA trie block;
   wherein the labeled PATRICIA trie block is maximum the number of pointers, the number of pointers determines a fanout in said PATRICIA trie block;

creating the labeled PATRICIA trie block based on said determining a number of bits for a status indicator and the determining of said fanout;
the determining of said fanout comprises the steps of:
selecting a number of bits devoted to storing a number of nodes for a first practice value;
selecting a number of bits devoted to a number of left leaves for a second practical value;
selecting a number of bits devoted to said offset value for a third practice value;
selecting a number of bits devoted to said number of pointers for a fourth practical value;
said second practical value and said third practical value are substantially equal; and
selected values for said second practical value and said third practical value adhere to an inequality, wherein said third practice value plus logarithm sub two of sum of said second practical value, said third practical value and said fourth practical value is equal to or larger than logarithm sub two of block size, header size and said first practical value.

8. The computer memory of claim 7, wherein a total number of bits for said second practical value and said third practical value are aligned on at least half a byte.

* * * * *